United States Patent
Nemeth

(10) Patent No.: US 7,574,769 B1
(45) Date of Patent: Aug. 18, 2009

(54) REARVIEW MIRROR WIPER SYSTEM

(76) Inventor: Glenn Nemeth, 15 John St., Helmetta, NJ (US) 08828

( * ) Notice: Subject to any disclaimer, the term of this patent is extended or adjusted under 35 U.S.C. 154(b) by 0 days.

(21) Appl. No.: 11/893,176

(22) Filed: Aug. 15, 2007

(51) Int. Cl.
*B60S 1/44* (2006.01)
*B60S 1/46* (2006.01)
*B60S 1/26* (2006.01)
*B60S 1/60* (2006.01)
*B60S 1/56* (2006.01)

(52) U.S. Cl. .............................. 15/250.003; 15/250.01; 15/250.29; 15/250.26

(58) Field of Classification Search ............ 15/250.003, 15/250.002, 250.29, 250.26, 250.01
See application file for complete search history.

(56) References Cited

U.S. PATENT DOCUMENTS

| | | | | |
|---|---|---|---|---|
| 1,734,937 A | * | 11/1929 | Born ........................ | 15/250.19 |
| 2,563,696 A | * | 8/1951 | Wayne ..................... | 15/250.03 |
| 2,740,151 A | * | 4/1956 | Wayne ..................... | 15/250.03 |
| 2,798,242 A | * | 7/1957 | Zeininger et al. .......... | 15/250.4 |
| 2,906,129 A | * | 9/1959 | Redd ............................. | 74/57 |
| 3,618,156 A | * | 11/1971 | Riggs ...................... | 15/250.29 |
| 3,685,081 A | | 8/1972 | Pittman | |
| 3,855,661 A | | 12/1974 | Prince | |
| 3,866,258 A | | 2/1975 | DeGraw | |
| 3,940,822 A | | 3/1976 | Emerick et al. | |
| 3,968,537 A | | 7/1976 | Wagenhofer | |
| 4,873,740 A | * | 10/1989 | Vahrenwald et al. ... | 15/250.003 |
| 5,353,466 A | | 10/1994 | Smith | |
| 5,446,586 A | * | 8/1995 | Dornier ....................... | 359/507 |
| 5,522,112 A | * | 6/1996 | Tiffany, III ............... | 15/250.03 |
| 6,032,323 A | * | 3/2000 | Smith et al. ............ | 15/250.003 |
| 6,324,718 B1 | | 12/2001 | Johnson | |
| 6,546,890 B1 | | 4/2003 | Waters | |
| 7,069,617 B2 | | 7/2006 | James | |

FOREIGN PATENT DOCUMENTS

JP        5-293062       * 11/1993

* cited by examiner

*Primary Examiner*—Gary K Graham
(74) *Attorney, Agent, or Firm*—David J. Wilson

(57) ABSTRACT

In one aspect, the invention relates a rearview mirror wiper system suitable for use on, for example, large tractor-trailer trucks, delivery trucks, vans, motor homes, cars and other motor vehicles. The rearview wiper system of the present invention has many advantages over prior art systems. It ensures an even and adjustable pressure over the entire wiping surface, has a minimum of parts exposed to the elements so that it is less susceptible to icing and is easy for the user to maintain.

18 Claims, 4 Drawing Sheets

REARVIEW MIRROR WIPER SYSTEM

BACKGROUND OF INVENTION

Operating vehicles in inclement weather is difficult and many devices have been developed to aid drivers. For example, cars and trucks (not to mention boats, airplanes and trains) have windshield wipers to clear rainwater, snow and other forms of precipitation off of the windshield. Today, many vehicles also have wipers mounted for use on the rear window and mounted for use on headlights. However, wipers for outside rearview mirrors have not become popular even though the safety features of such devices are self-evident. This is because the prior art devices are not without problems of their own.

For example U.S. Pat. No. 6,324,718 to Johnson discloses a side mounted wiper assembly for external rearview mirrors. This device has two major problems. First, the mechanism responsible for moving the wiper across the mirror glass is exposed to the elements. Because of this, the mechanism is prone to corrosion and, in the event of a freezing rain or heavy snow, can become inoperative. Additionally, the wiper is only secured or mounted on one end. Where such an arrangement may be necessary for windshield wipers it is a disadvantage for wipers on rearview mirrors. When driving, air currents push windshield wipers against the glass helping the wipers to maintain contact with the glass. However, air currents moving around the mirror, especially at speeds necessary for highway travel, can act to lift the wiper off of the mirror glass. The result is that the wiping action by the wiper is less effective or ineffective when it is needed most leaving, for example, streaks that interfere with visualizing objects with the rearview mirror.

U.S. Pat. No. 6,546,590 to Waters discloses a clamp-on wiper assembly for truck rearview mirrors. This device has several problems. First, the wiper, while being attached on both sides, runs up a partially exposed track on small wheels. This design does not prevent the device from freezing since much of the mechanism is exposed to the elements. Another problem with the device is that the wiper is moved via an extending telescopic arm that is attached to only one side of the wiper blade. Such a design is inherently flawed since the trailing end of the wiper blade as well as the wiper itself creates a drag on the system. This drag results in 1) a burden on the motor and drive system leading to damage of the system and/or premature failure and 12) the uneven cleaning of the mirror glass.

U.S. Pat. No. 7,069,617 to James discloses a pneumatic wiper system for rearview mirrors. This system is design to be spliced into and powered by the truck's pneumatic air source used for the truck's air brake system. The wiper is moved across the mirror glass in a motion that is horizontal to the ground. The wiper is mounted in the middle of the blade. Because of the natural and necessary flexibility of the wiper blade (being made out of a natural or synthetic rubber) the blade and is susceptible to vibration and motion caused by air currents resulting from vehicle movement. This problem results in the less effective or ineffective cleaning of the mirror glass. Additionally, the pneumatic system operates a push rod to which the wiper is attached. This push rod is susceptible to being rendered inoperable in icy conditions.

U.S. Pat. No. 3,685,081 to Pittman discloses a rearview mirror wiper mechanism but suffers from the design flaw of the wiper being supported on one end only and, thus, is susceptible to wind conditions caused during driving, as are the systems above It also utilizes a complicated and expensive to manufacture double track mechanism within the mirror housing to maintain the blade's horizontal position during use.

U.S. Pat. No. 3,866,258 to DeGraw discloses a rearview wiper mechanism that suffers from having a large number of moving parts exposed to the elements. This design is subject to freezing solid when exposed to freezing rain or sleet and snow, especially when the vehicle is parked for any length of time. Because of the plethora of moving parts exposed to the weather, the device would be difficult to clean of ice without damaging the mechanisms.

U.S. Pat. No. 3,855,661 to Prince discloses a rearview wiper mechanism that also suffers from 1) exposed moving parts and 2) the wiper blade only being supported at one location. Thus, this device is also prone to problems caused by icing and wind current causing havoc with the blade leading to uneven cleaning of the mirror surface.

U.S. Pat. No. 3,940,822 to Emerick and Davis discloses a wiper device for rearview mirrors that causing the wiper blade to rotate or spin over a limited portion of the mirror. Since a rearview mirror is typically rectangular, this rotating wiper blade design can only clean a small portion of the overall surface area of the mirror leaving a large portion of the mirror uncleaned. Also, this design requires a hole be drilled in the mirror glass so the wiper can be mounted and powered U.S. Pat. No. 3,968,537 to Wagenhofer discloses a rearview mirror wiper device. This device suffers from the problem of having the wiper blade supported only on one end of the blade. This design cannot ensure that the blade receives even pressure along the entire length of the blade thus resulting in uneven cleaning of the mirror glass.

U.S. Pat. No. 5,353,466 to Smith, et al., discloses a rearview mirror wiper mechanism that is driven by a complicated system of cables, pulleys and gears. Inherent problems in this device are the loosening and stretching of the cables, cables running off of the pulleys and cables breaking. Additionally, this device is difficult and expensive to manufacture and difficult to maintain to ensure optimal performance.

Thus, what is needed is a rearview wiper system that ensures even and adjustable pressure over the entire surface of the wiper blade for optimal cleaning of the mirror glass, has a minimum of parts exposed to the elements and is easy for the user to maintain.

SUMMARY OF INVENTION

In one aspect, the invention relates a rearview mirror wiper system suitable for use on, for example, large tractor-trailer trucks (i.e., semi-trailer trucks or semi, colloquially known as a transfer truck, 18-wheeler, semi, or big-rig in the U.S.; as a semi in Australia, and Canada; and as an articulated lorry (artic), or truck and trailer in the UK, Ireland, and New Zealand), delivery trucks, vans, motor homes, cars and other motor vehicles. The rearview wiper system of the present invention has many advantages over prior art systems. It ensures an even and adjustable pressure over the entire wiping surface, has a minimum of parts exposed to the elements so that it is less susceptible to icing and is easy for the user to maintain.

In one embodiment of the present invention, the rearview wiper system of the present invention contemplates a wiper blade supported at both ends of the blade wherein both ends of the blade are powered at the same speed for even movement across the mirror glass of the rearview mirror. Although the present invention is not limited to any particular mechanism for moving the blade, a preferred mechanism ensures that the blade moves evenly across the glass and with a minimum of jumping or skipping. In this regard, in a preferred embodiment, the wiper system of the present invention is controlled by a pair of drive rods where each drive rod comprises a first and second set of spiral wound grooves that are singularly disposed relative to one another and are connected at the ends thereof and wherein the drive rods are rotated by a motor. The motor may rotate both of the drive rods directly (the preferred embodiment) or may rotate one drive rod with the other drive rod rotating freely as a result of the wiper blade moving across the mirror glass. A tracking device is located on each drive rod that moves along the drive rod as the drive rod is turned by the motor. One end of the wiper blade is attached directly or indirectly to each tracking device. Thus, as the drive rods turn, the tracking devices travel the length of the drive rods by tracking in the first of the spiral would groves in the drive rod and move the wiper blade with them. When the tracking devices reach the end of the drive rods they then track down the second spiral wound grove of the drive rod. Thus, the tracking devices continue to move the wiper blade across the mirror glass of the rearview mirror as long as the motor turns the drive rods. This design solves problems associated with the many of the prior art devices since the wiper blade is drawn evenly across the glass with no or virtually no skipping or jumping.

The wiper blade of the present invention is not limited by the method of attachment of the blade to the tracking devices. The wiper blade may be attached directly or indirectly to the tracking devices. In one embodiment, the wiper blade is mounted on the tracking device with a tension device, the tension device being designed to provide a constant and even pressure of the wiper blade on the mirror glass of the rearview mirror. In one embodiment, the tension device of the present invention is adjustable by the user allowing the user to increase or decrease the tension applied to the wiper blade. In another embodiment, the tension device is not adjustable by the user and is preset at the point of manufacture or is self adjusting by, for example, the use of springs to maintain the correct tension and pressure of the wiper blade on the mirror glass. In one embodiment, it is contemplated that the tension device of the present invention comprises a screw and spring mechanism wherein a spring is used to create the pressure necessary to maintain a good and even contact of the wiper blade on the mirror glass and wherein a screw is used to increase or decrease the tension of the spring thereby allowing the adjustment of the tension and/or pressure or the wiper blade as necessary for the best cleaning of the mirror glass. See, for example, part no. 30 of FIGS. 1 and 2.

This rearview mirror wiper system of the present invention is less prone to failure (than prior art systems, for example) due to, for example, icing because most of the moving parts of the device are protected from the elements by being enclosed in the housing of the device. See, for example, FIGS. 2, 3 and 4. Additionally, in one embodiment of the present invention, it is contemplated that the internal mechanical mechanisms of the present invention are sealed from the elements with flexible flap seals. The flexible flap seals of the present invention are positioned to prevent rain, ice, etc. (i.e., weather elements, weather conditions or precipitation) from entering the housing of the present invention.

The following exemplary description will aid in helping one to understand fully how the flap seals of the present invention protect the mechanical mechanisms of the present invention. When the wiper of the present invention is in operation, the wiper blade is moved across the mirror glass of the rearview mirror with the aid of the tracking devices of the present invention. The tracking devices follow the groves of the drive rods of the present invention. The drive rods are internally housed in the rearview mirror housing whereas the tracking devices extend to the exterior of the rearview mirror housing See, for example, FIG. 4. As the tracking devices of the present invention move along the drive rods, they are moved along openings running essentially the length of the mirror glass and located on either side of the mirror glass. The tracking devices pass out of the mirror housing through these openings. Along the length of the openings run the flexible flap seals of the present invention. In a preferred embodiment, each opening comprises two flap seals, one on either side of the opening. The flap seals serve to seal and protect the interior of the mirror housing from the weather elements by eliminating or limiting an entry point for the weather elements. As the tracking device runs along the opening, the flap seals bend (flex) to allow the movement of the tracking device and reseal the opening after passage of the tracking device. Although the present invention is not limited to the material (s) with which the flap seals are made, in a preferred embodiment, the flap seals comprise one or more natural or synthetic rubber compositions. In one embodiment of the present invention, the flap seals are located between the mirror and housing where said tracking device exits said housing through the above describe openings.

In another embodiment, the present invention contemplates that the rearview wiper system of the present invention may be designed so that it may be added to an existing rearview mirror that was manufactured without such a device. In this regard, the rearview wiper system of the present invention would attach to an existing mirror by, for example, clamps or a clamping mechanism or by screws, rivets or adhesives or a combination thereof. When designed as an add-on device, the rearview wiper system of the present invention may be design such that the motor unit of the device is located in a housing, for example, that is positioned below or above the rearview mirror. The drive rods of the add-on rearview system of the present invention would then, for example, extend along the sides of the rearview mirror within the device housing or within extensions of the device housing. One practiced in the art will understand, based on the teachings of this specification, that other variations of the add-on rearview wiper device of the present invention comprising, for example, essentially sealed internal mechanisms, a wiper blade supported at both ends and a tension system or device that ensures a constant and even pressure on the wiper blade of the present invention, are possible and are included herein. In another embodiment, the present invention contemplates a replacement rearview mirror comprising the rearview mirror wiper system of the present invention. Said replacement rearview mirror could be purchased by vehicle owners and used to replace the existing rearview mirror.

The rearview mirror wiper system of the present invention is designed such that it can be operated or controlled by the driver of the vehicle from within the vehicle. In one embodiment, the rearview mirror wiper system of the present invention is operated or controlled by a wired control panel or control box. In another embodiment, the control panel or control box is wireless and operates via, for example, infrared or radio frequency waves, analogous to, for example, a television remote. The design and manufacture of wired and wireless controls are well known in the art and are not covered here. The control panel or control box of the present invention, whether wired or wireless, may comprise, for example, an on/off switch, a speed control to regulate the speed of the motor and, therefore, the speed of the wiper and, in one embodiment, a control to operate a washer spray similar to those found in vehicles to wash windshields. Such a washer system may operate off of the washer fluid supply of the vehicle or the rearview wiper system of the present invention may comprise a reservoir for the storage of washer fluid. Such a reservoir may be positioned in the rearview mirror housing or outside of the housing.

The rearview wiper system of the present invention, in one embodiment, comprises instructions for the operation and maintenance of the system. For the add-on version of the rearview wiper system of the present invention, the instructions would include information about attaching, connecting the mirror to the vehicles electrical system and adjusting the system to the rearview mirror of the vehicle. For the replacement version of the rearview wiper system of the present invention, the instructions would include information about removing the old rearview mirror and attaching the new mirror and connecting the motor to the vehicles electrical system.

In one embodiment of the present invention, the rearview wiper system of the present invention is operated by the vehicles electrical system in another embodiment of the present invention, the rearview wiper system of the present invention is operated by batteries that may be rechargeable and/or replaceable.

In one embodiment, the present invention contemplates a kit comprising an add-on rearview wiper system of the present invention and instructions. In another embodiment, the present invention contemplates a kit comprising a replacement rearview mirror, said rearview mirror comprising the rearview wiper system of the present invention and instructions for replacing the rearview mirror with the mirror comprising the rearview wiper system of the present invention along with operation and maintenance instructions.

In each of the embodiments of the rearview wiper system of the present invention herein contemplated, the rearview wiper system of the present invention may, but need not, comprise one or more drain holes for the draining of any fluid (e.g., rain water) that may find its way into the housing.

In another embodiment, the present invention contemplates a method of use for the rearview wiper system of the present invention. In one embodiment of a method of use for the present invention, the driver of the vehicle turns on the wiper system of the present invention using the control panel or control box of the present invention when the rearview mirror glass needs to be cleared of water or other obstructions (e.g., ice, small leaves, bugs, etc.). The driver may then control the speed of the wiper if the system of the invention is so equipped. The driver would then turn off the system when the drive determined that the wiper was no longer need to maintain clear vision in the rearview mirror. These or similar methods of use may be contained in instructions provided with the rearview wiper system of the present invention.

In one embodiment of the present invention, the wiper blade of the present invention comprises a flexible blade (e.g., a squeegee or similar type of blade also called the wiping end of the wiper blade) mounted in a holder (e.g., a metal holder) or fixed end of the wiper blade. The blade is comprised of, for example, one or more of a natural or synthetic rubber compositions so it can flex or bend one way or the other as the wiper wipes the mirror glass. The degree to which the wiper blade flexes or bends as it wipes the glass is not critical so long as the wiper blade is effective in clearing or cleaning the glass.

Additionally, in another embodiment of the present invention, said tension device may be designed such that the wiper blade may flip slightly (e.g., by about 2-10 degrees) such that the wiping portion of the wiper blade is trailing the fixed portion of the wiper blade as the wiper blade is pulled across the mirror glass. That the wiping portion of the blade is flexible and/or the wiper is capable of flipping back and forth slightly as the motion of the wiper changes direction across the mirror glass, aids in the wiper clearing the glass of water or other obstructions to the driver's view.

Although the drawing figures accompanying this specification show the wiper blade oriented in a horizontal position, the present invention also contemplates that the wiper blade may be oriented in a vertical position and the associated parts of the system would likewise be reoriented.

Other features and advantages of the invention will be apparent from the following description.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
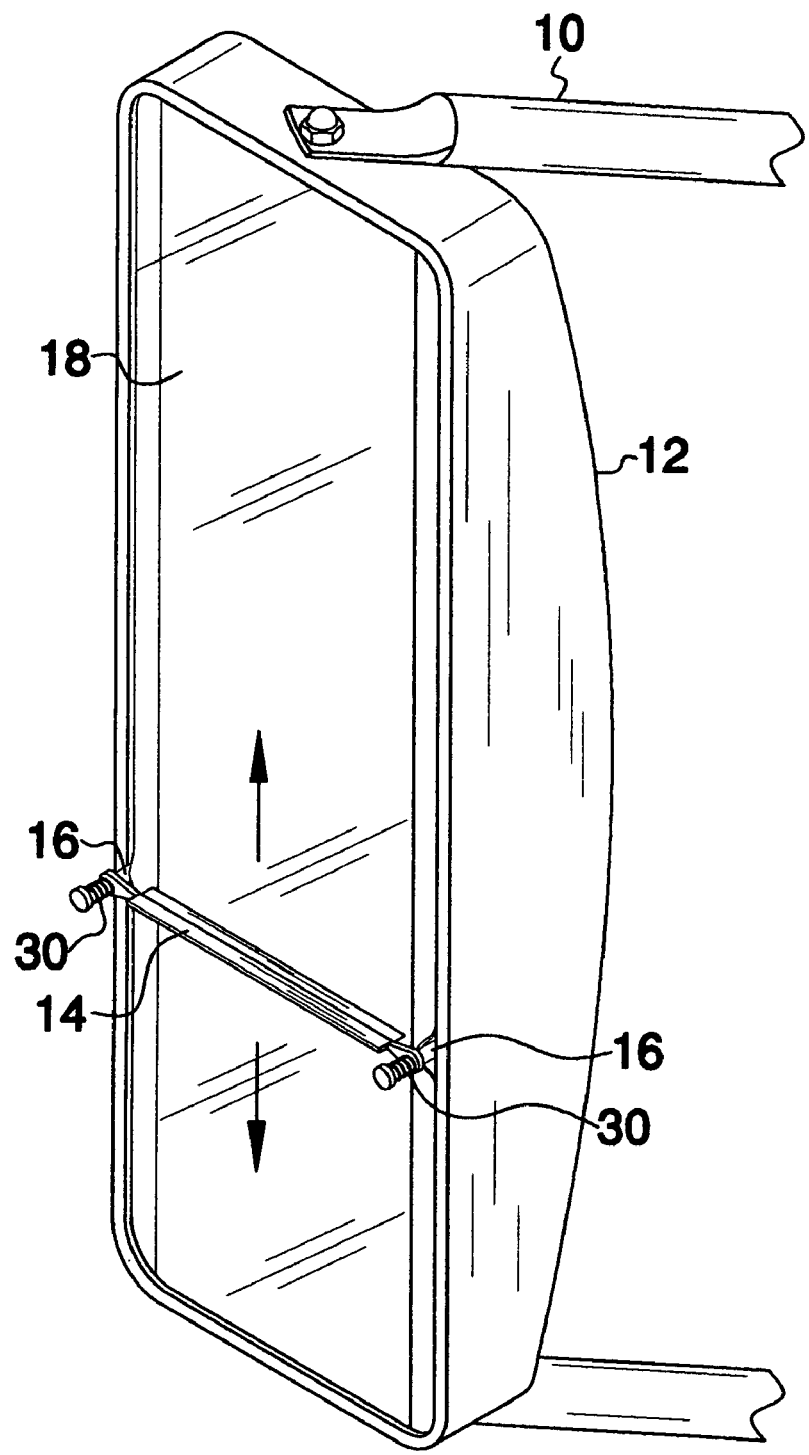
FIG. 1 shows one embodiment of an external view of the rearview mirror wiper system of the present invention. Arrows indicate direction of movement of wiper blade.

FIG. 1 shows an external view of one embodiment of the rearview wiper system of the present invention. The housing 12 is supported by mounting brackets 10. The wiper blade 14 is supported by two tracking devices 16 and 16a. The tension on the wiper blade 14 is provided by two tension devices 30. The mirror glass is 18.

Figure 2:
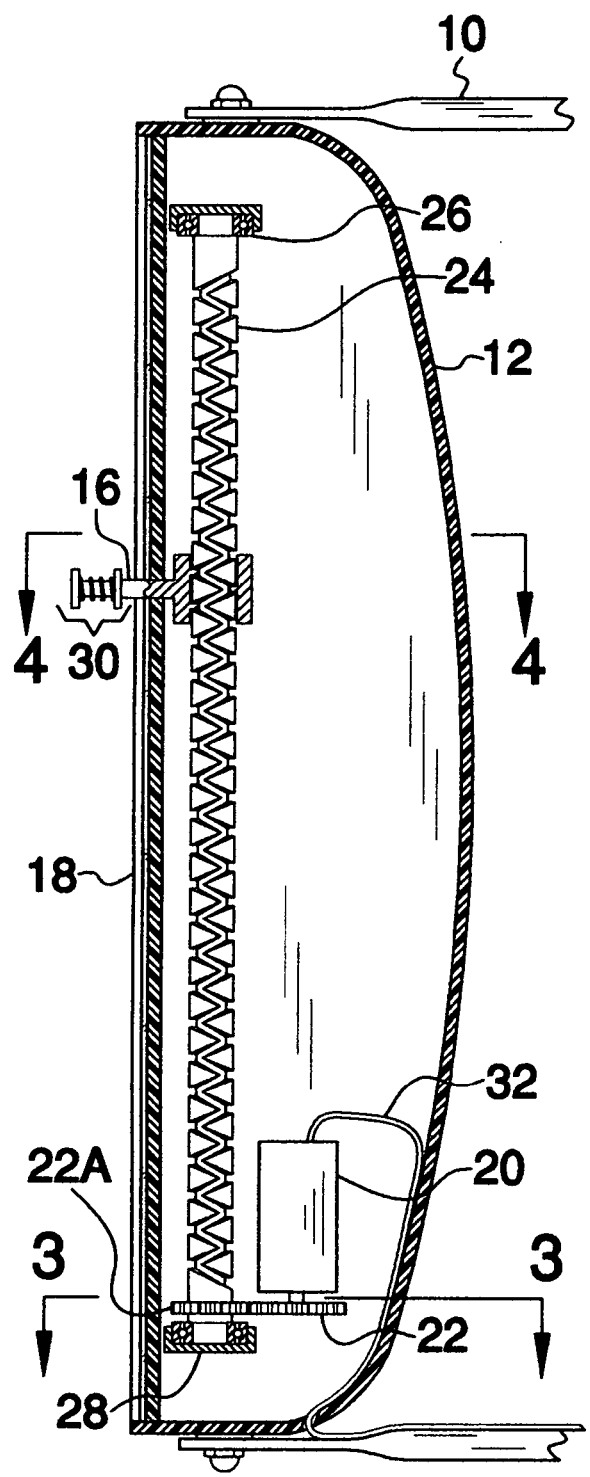
FIG. 2 shows one embodiment of an internal view of the rearview wiper system of the present invention.
Figure 3:
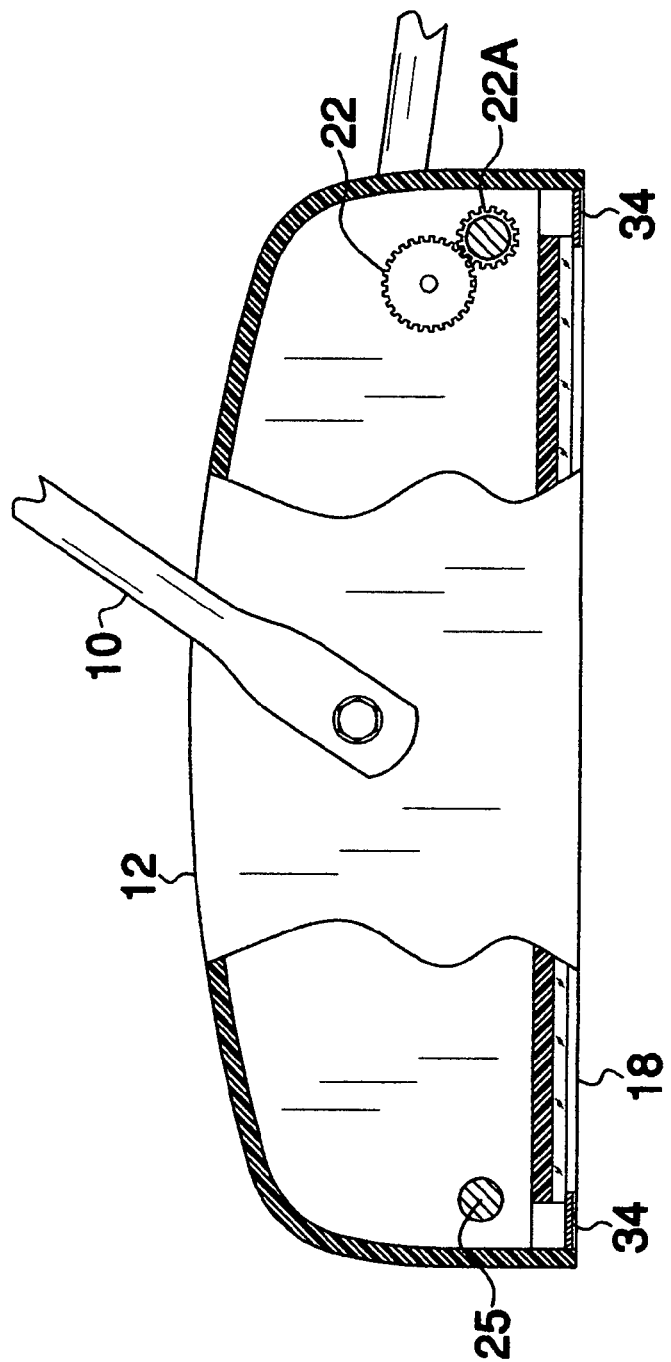
FIG. 3 shows a cross section of one embodiment of the rearview wiper system of the present invention wherein the gears interconnecting the motor to the drive means are evident.

FIG. 2 shows an internal view of one embodiment of the present invention. The housing 12 is supported by mounting brackets 10. The motor 20 has power supplied by electrical power from, for example, the vehicles electrical system through wire(s) 32. The motor turns one or more gears 22 which are intermeshed directly or indirectly with gears 22a attached to the drive rods 24 and (as shown in FIG. 3) 25. Tracking device 16 is shown intermeshing with drive rod 24. The tension setting device 30 is shown on tension device 16. The drive rods are supported by bearings 26 and 28.

FIG. 3 shows a cross sectional view of the lower portion of one embodiment of the rearview wiper system of the present invention. Shown are the housing 12, one mounting bracket 10 and the mirror glass 18. Also shown are drive rods 24 and 25. Although this figure only shows drive gear(s) 22 intermeshing with one drive rod, it is contemplated the motor of the present invention would provide power to one or both of the drive rods. One practiced in the art would be able to design such a system using, for example, a series of gears or drive shafts to bring power from the motor to both drive rods. Also indicated on the figure as flexible flap seals 34.

Figure 4:
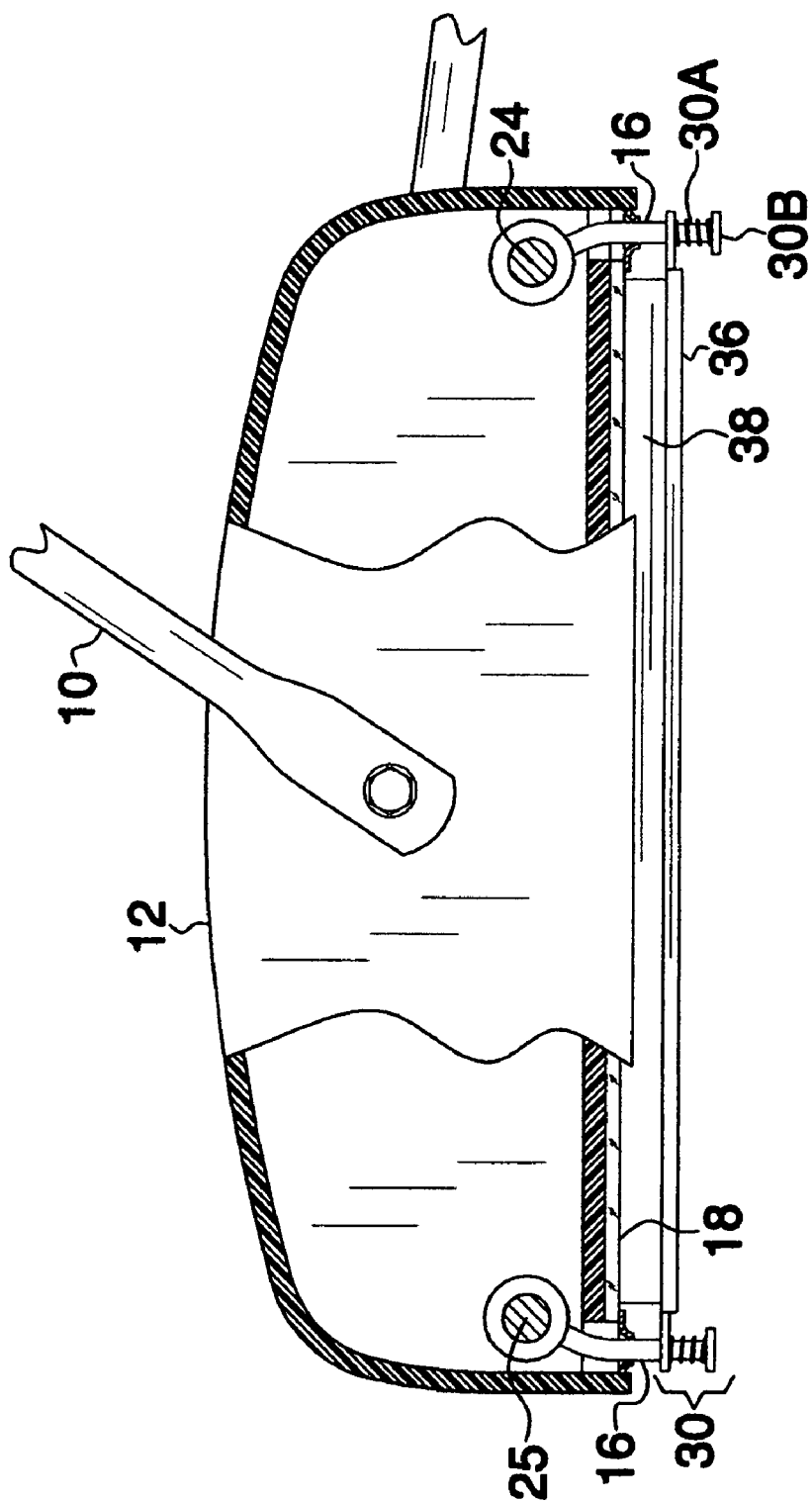
FIG. 4 shows a cross section of one embodiment of the rearview wiper system of the present invention wherein the tracking devices of the present invention are evident.

FIG. 4 shows a cross sectional view of the middle to upper portion of one embodiment of the present invention. Shown are the housing 12, one mounting bracket 10 and the mirror glass 18. Also shown are drive rods 24 and 25. Tracking devices 16 are shown intermeshing with drive rods 24 and 25. Tension devices 30 and 30 are shown on the tracking devices 16. Tension devices comprise a tension spring 30*a* and adjustment screw 30*b*. Wiper is shown with flexible wiper portion 38 contacting the mirror glass 18. Flexible wiper portion is held with fixed portion of the wiper blade 36.

What is claimed is:

1. A rearview mirror with a wiper system for a truck or other motor vehicle, comprising:
    a. a housing, said housing containing i) a motor, ii) a drive means, iii) a tracking means, iv) a mirror glass and, v) a wiper blade comprising a first and second end and a flexible wiper element mounted in a support, wherein said motor powers said drive means which in turn moves said wiper across the mirror glass of said rear view mirror;
    b. wherein said motor is interconnected with said drive means;
    c. wherein said drive means comprises a first and second drive rod each comprising a first and second set of spiral wound grooves that are singularly disposed relative to one another and are connected at the ends thereof and wherein said drive rods are rotated by said motor;
    d. wherein said tracking means comprises a first and second tracking device, said first and second tracking device connecting said first and second drive rod with the first and second end of said wiper, respectively, said first and second tracking device comprising a tension system to ensure a constant and even pressure of the wiper on the mirror glass, wherein said wiper is mounted such that said wiper blade is capable of flipping back and forth by about 2-10 degrees as the wiper changes directions across the mirror glass and wherein said drive means is protected from the weather by flexible flap seals through which the tracking means traverses.

2. The rearview mirror of claim 1, wherein said device additionally comprises an opening between said housing and each edge of said mirror glass, one or more flap seals being located at said opening and essentially covering said opening.

3. The rearview mirror of claim 1, wherein said rearview mirror additionally comprises a washer system.

4. The rearview mirror of claim 1, wherein said motor is controlled by a wireless remote control device.

5. The rearview mirror of claim 1, wherein said motor is controlled by a wired remote control device.

6. The rearview mirror wiper system of claim 1, wherein said motor is capable of being operated at variable speeds.

7. The rearview mirror wiper system of claim 1, wherein said motor is interconnected with said drive means with one or more of gears, cables, bands, levers or wheels.

8. The rearview wiper device of claim 1, wherein said first and second tracking devices each comprise a spring wherein the tension of the spring can be controlled by a screw.

9. A wiper system designed for reversible attachment to a rearview mirror of a truck or other motor vehicle, comprising:
    a. a housing, said housing containing i) a motor, ii) a drive means, iii) a tracking means and, iv) a wiper blade comprising a first and second end and a flexible wiper element mounted in a support, wherein said motor powers said drive means which in turn moves said wiper across the mirror glass of said rear view mirror and wherein said housing additionally comprises a means for reversibly attaching the wiper system to a rearview mirror;
    b. wherein said motor is interconnected with said drive means;
    c. wherein said drives means comprises a first and second drive rod each comprising a first and second set of spiral wound grooves that are singularly disposed relative to one another and are connected at the ends thereof and wherein said drive rods are rotated by said motor;
    d. wherein said tracking means comprises a first and second tracking device, said first and second tracking device connecting said first and second drive rod with the first and second end of said wiper, respectively, said first and second tracking device comprising a tension system to ensure a constant and even pressure of the wiper on the mirror glass, wherein said wiper is mounted such that said wiper blade is capable of flipping back and forth by about 2-10 degrees as the wiper changes directions across the mirror glass and wherein said drive means is protected from the weather by flexible flap seals through which the tracking means traverses.

10. The rearview mirror of claim 9, wherein said device additionally comprises an opening between said housing and each edge of said mirror glass, one or more flap seals being located at said opening and essentially covering said opening.

11. The rearview mirror of claim 9, wherein said rearview mirror additionally comprises a washer system.

12. The rearview mirror of claim 9, wherein said motor is controlled by a wireless remote control device.

13. The rearview mirror of claim 9, wherein said motor is controlled by a wired remote control device.

14. The rearview mirror wiper system of claim 9, wherein said motor is capable of being operated at variable speeds.

15. The rearview mirror wiper system of claim 9, wherein said motor is interconnected with said drive means with one or more of gears, cables, bands, levers or wheels.

16. The rearview wiper device of claim 9, wherein said first and second tracking devices each comprise a spring wherein the tension of the spring can be controlled by a screw.

17. A rearview mirror with a wiper system for a truck or other motor vehicle, comprising:
    a. a housing, said housing containing i) a motor capable of being operated at variable speeds, ii) a drive means, iii) a tracking means, iv) a mirror glass v) a wiper blade comprising a first and second end and a flexible wiper element mounted in a support, wherein said motor powers said drive means which in turn moves said wiper across the mirror glass of said rear view mirror and, vi) a remote control device;
    b. wherein said drives means comprises a first and second drive rod each comprising a first and second set of spiral wound grooves that are singularly disposed relative to one another and are connected at the ends thereof and wherein said drive rods are rotated by said motor;
    c. wherein said motor is interconnected with said drive means via gears;
    d. wherein said tracking means comprises a first and second tracking device, said first and second tracking device connecting said first and second drive rod with the first and second end of said wiper, respectively, said first and second tracking device comprising a tension system, said tension system comprising a spring wherein the tension of the spring can be controlled by a screw, to ensure a constant and even pressure of the wiper on the mirror glass, wherein said wiper is mounted such that said wiper blade is capable of flipping back and forth by about 2-10 degrees as the wiper changes directions across the mirror glass and wherein said drive means is protected from the weather by flexible flap seals through which the tracking means traverses; and e. wherein said motor is operated by the remote control device.

18. The rearview wiper system of claim 17, wherein said system additionally comprises a washer system.

* * * * *

UNITED STATES PATENT AND TRADEMARK OFFICE
Certificate

Patent No. 7,574,769 B1
Patented: August 18, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Glenn Nemeth, Helmetta, NJ (US); and Ruth Ann Osolin, Freehold, NJ (US).

Signed and Sealed this Twenty-third Day of February 2010.

MONICA S. CARTER
*Supervisory Patent Examiner*
Art Unit 3727